United States Patent
Brewen

(10) Patent No.: US 6,690,639 B2
(45) Date of Patent: Feb. 10, 2004

(54) OPTICAL TAPE TRANSPORT SYSTEM USING FOCUS STABILIZER

(75) Inventor: Alan T. Brewen, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 148 days.

(21) Appl. No.: 10/032,522

(22) Filed: Oct. 19, 2001

(65) Prior Publication Data

US 2003/0076772 A1 Apr. 24, 2003

(51) Int. Cl.$^7$ .............................................. G11B 25/06
(52) U.S. Cl. ........................................ 369/258; 369/93
(58) Field of Search ...................... 369/258, 93, 94; 360/130.2, 130.21, 130.22, 130.23, 130.3, 130.31, 130.32, 130.33; 352/222, 228, 229

(56) References Cited

U.S. PATENT DOCUMENTS

| | | | |
|---|---|---|---|
| 4,973,150 A | * 11/1990 | Bryant | 352/222 |
| 5,284,308 A | * 2/1994 | Comeaux et al. | 360/96.1 |
| 5,513,163 A | * 4/1996 | Kim | 369/97 |
| 5,563,867 A | * 10/1996 | Gregg | 369/84 |
| 5,587,993 A | * 12/1996 | Gregg | 369/291 |
| 5,777,823 A | 7/1998 | Gavit | |

FOREIGN PATENT DOCUMENTS

| | | | | |
|---|---|---|---|---|
| GB | 2257820 A | * | 1/1993 | ........... G11B/15/60 |
| JP | 63206942 A | * | 8/1988 | ........... G11B/15/60 |
| JP | 01109535 A | * | 4/1989 | ........... G11B/07/00 |
| JP | 05234197 A | * | 9/1993 | ........... G11B/15/61 |
| JP | 06195755 A | * | 7/1994 | ........... G11B/07/24 |
| WO | WO 9608818 A1 | * | 3/1996 | ........... G11B/07/00 |

OTHER PUBLICATIONS

"The Foil Bearing—A New Departure in Hydrodynamic Lubrication" by H. Blak et al., Lubrication Engineering, Dec. 1953, pp. 316–320.

"On Controlling The Film Thickness in Self–Acting Foil Bearings" by A. Eshel, Journal of Lubricatoin Technology, Apr. 1970, pp. 359–362.

* cited by examiner

Primary Examiner—William Klimowicz
(74) Attorney, Agent, or Firm—Raymond L. Owens

(57) ABSTRACT

An optical tape transport system including an optical head, tape transport structure and a focus stabilizer element including the stabilizer element including a cylindrical surface section supports the full width of the tape; the stabilizer element being disposed on the opposite side of the tape from the optical head; the optical axis of the optical head being perpendicular to the stabilizer surface at the point of intersection between the optical axis and the stabilizer surface; the tape being supported at the stabilizer surface by an air film; and the air film thickness at the point of intersection being in the range 1–50 $\mu m$ while the tape is transported for reading or writing.

8 Claims, 4 Drawing Sheets

(Prior Art)

OPTICAL TAPE TRANSPORT SYSTEM USING FOCUS STABILIZER

FIELD OF THE INVENTION

The present invention relates to an optical tape transport system.

BACKGROUND OF THE INVENTION

Tape-based media are used for high-capacity data storage systems because the recording surface area on a reel of thin tape is very large relative to the cassette or cartridge volume. However, the potential for high-capacity storage can only be realized if the spacing and orientation between the recording surface and the transducer head—the head/media interface—is held within very tight tolerances. For both magnetic and optical recording, these tolerances are much less than one micron. Furthermore, the stability of the head/media interface must be maintained under conditions of rapid tape transport so that the rate of data recording or readout will be high enough to match the data capacity.

In magnetic tape recording, the magnetic heads that sense and record magnetic domains must be held extremely close to the tape surface. A tape transport mechanism holds the tape in contact with the surface of the magnetic heads to maintain this tight spacing tolerance or axial stability. Although other parts of the tape path can be controlled using polished pins, rollers, or air bearing elements that handle the tape gently, the tape slides against the head elements with a high relative velocity, typically much greater than 1 m/s. This characteristic of magnetic tape transports gives rise to tape wear at the head/media interface.

Optical recording systems must also maintain a tight tolerance in the spacing between the media surface and the optical head. However, there is a relatively large spacing, typically 0.1–1 mm, between the media surface and the objective lens which is the closest element of the head. This spacing eliminates the risk of media wear at the head/media interface. On the other hand, the difference in spacing between heads and media precludes the use of magnetic tape transport methods for axial stabilization of optical tape.

In prior art optical recording systems, axial stabilization is provided by a closed-loop servo system that controls the position of the objective lens in response to optically-derived error signals. This approach is suitable for disk-based systems for which the media runout is periodic and limited to the lowest harmonics of the disk rotation frequency. Optical tape systems require additional stabilization to achieve adequate focus control. Axial flutter (normal to the tape surface) must typically be held below 0.5 $\mu$m for frequencies above 1 kHz.

An optical tape drive is distinguished from an optical disk drive by other requirements. The optical tape transport must provide intermittent media transport while minimizing tape wear from frequent stops and starts. For linear data formats (data bands recorded down the length of the tape), bi-directional operation is required. For multitrack recording, the transport must provide simultaneous axial stability and media perpendicularity with respect to the optical axis across the field of view of the objective lens used for writing and reading.

SUMMARY OF THE INVENTION

It is an object of this invention to provide focus stabilization for optical tape that is written or read by an optical head while minimizing wear to the front and back surfaces of the tape during movement past the optical head.

It is a further object of this invention to prevent asperities on the surface of the tape from causing focus errors.

It is a further object of this invention to provide focus stabilization across the full width of the optical tape.

It is a further object of this invention to provide sufficient perpendicularity between the media surface and the optical axis across the width of a data band as it is written or read on the optical tape.

These objects are achieved by an optical tape transport system including an optical head, tape transport means, and a focus stabilizer element, the improvement comprising:

a) the stabilizer element including a cylindrical surface section supports the full width of the tape;

b) the stabilizer element being disposed on the opposite side of the tape from the optical head;

c) the optical axis of the optical head being perpendicular to the stabilizer surface at the point of intersection between the optical axis and the stabilizer surface;

d) the tape being supported at the stabilizer surface by an air film; and e) the air film thickness at the point of intersection being in the range 1–50 $\mu$m while the tape is transported for reading or writing.

ADVANTAGES

The present invention has the advantage of reducing focus runout and improving focus stabilization for optical tape while it is written or read by one or more optical heads.

It is a further advantage of the present invention that it reduces wear to the surfaces of the optical tape medium caused by contact with tape drive components during transport past an optical head.

It is a further advantage of the present invention that it prevents asperities on the surface of the tape from causing focus errors.

It is a further advantage of the present invention that is provides focus stabilization across the full width of the optical tape.

It is a further advantage of the present invention that it permits a rigid interface between an optical head and an associated tape transport, improving alignment tolerance between the head and media.

DETAILED DESCRIPTION OF THE INVENTION

Figure 1:
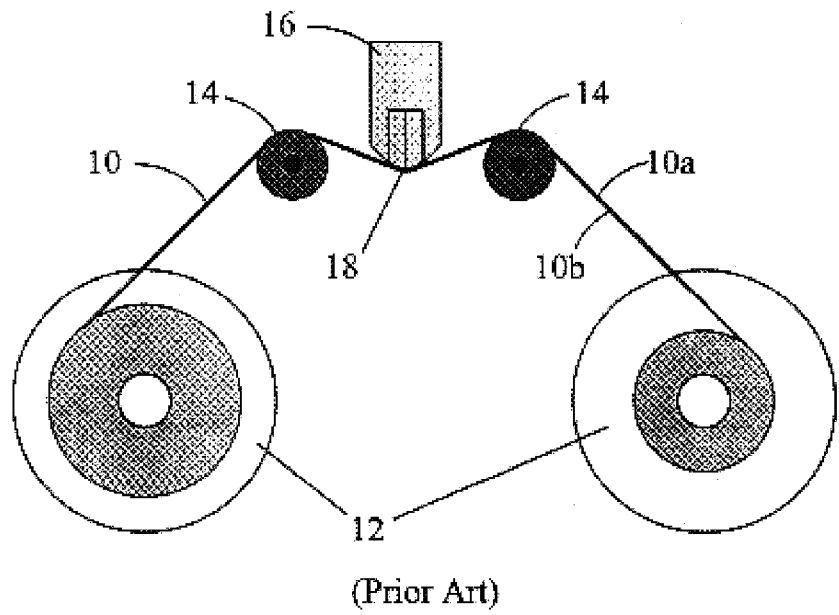
FIG. 1 shows how magnetic tape is transported over a transducer head according to the prior art.

The prior art method for transporting and stabilizing magnetic tape in a magnetic tape transport system or drive is illustrated in FIG. 1. The magnetic tape 10 with a recording surface 10a and a back surface 10b is wound on and transported between two reels 12. The tape path is threaded around transport elements 14 that can include rollers, guides, and bearings. The tape also passes over a magnetic head 16. Tape tension forces the recording surface into contact with the magnetic head at the head/media interface 18 where the magnetic head writes and reads data. Intimate contact between the tape and the magnetic head is critical because the recording and readout resolution are severely degraded by any spacing at the head/media interface.

Figure 2:
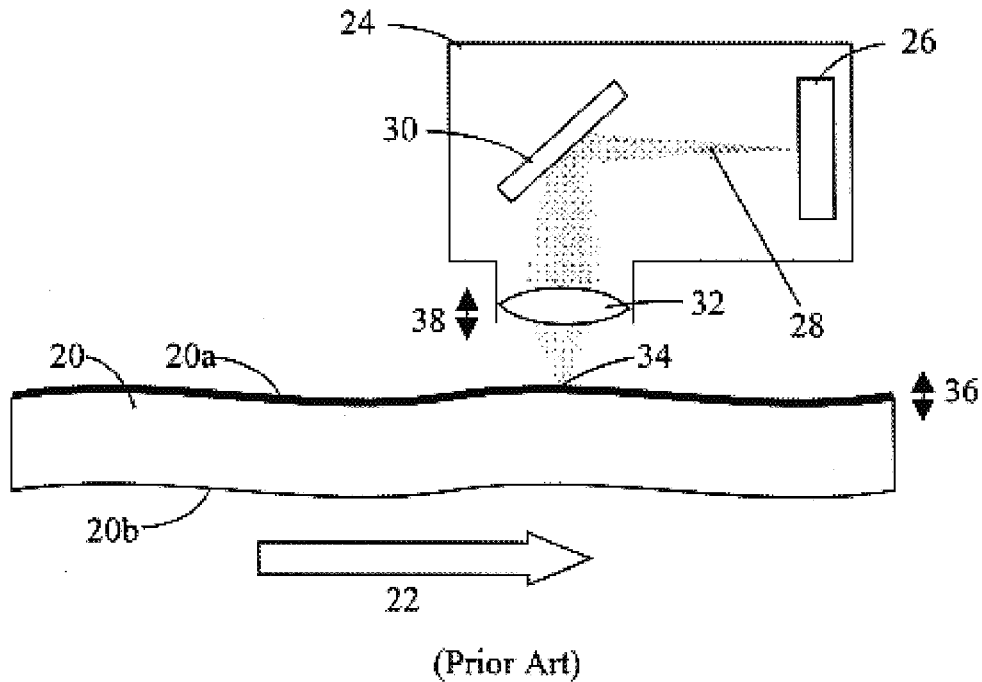
FIG. 2 describes closed-loop focus control for optical recording according to the prior art.

The head/media interface for an optical recording does not require intimate contact between the recording medium and the optical head. This principle is illustrated in FIG. 2. An optical tape 20 with a recording surface 20a and a back surface 20b is scanned in a tape transport direction 22 past an optical head 24. A laser 26 within the optical head emits a laser beam 28 that is directed and conditioned by optical elements such as mirror 30 and focused through an objective lens 32 to form a focused spot 34 located outside the envelope of the optical head along an optical axis of the head. The optical head is able to read or write information on the surface of the optical tape provided that the focused spot is positioned on the recording surface with a tolerance of about ±1 µm. A related requirement is that the media surface is perpendicular to the optical axis in the vicinity of the focused spot and across the field of view accessed by the objective lens. The tolerable deviation from exact perpendicularity is typically less than 1 degree.

During tape transport, the optical tape medium experiences axial runout 36, moving closer or further from the optical head. If the head and the objective lens were fixed in position, the axial runout would cause the recording surface to shift in and out of focus, above or below the focused spot of laser light. According to the prior art, the objective lens is supported by an actuator 38 that moves the objective lens in the direction parallel to its optical axis to maintain the focused spot coincident with the recording surface. However, with ordinary tape transport technology, the axial runout of optical tape can include high-frequency dynamical components that exceed the bandwidth limits of the focus actuator, causing focus errors.

Figure 3:
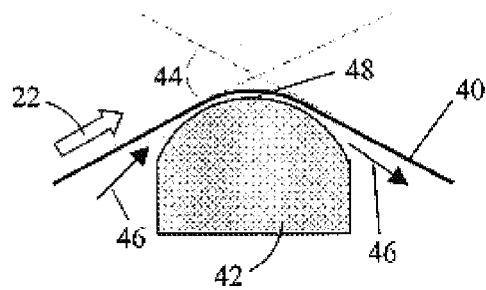
FIG. 3 illustrates principles related to the prior art use of a hydrodynamic foil air bearing.

So-called "foil air bearings" for stabilization of transported flexible tape are known in the prior art. FIG. 3 illustrates principles related to a hydrodynamic air bearing. A tape 40 is transported in a direction 22 over a hydrodynamic air bearing element 42. The tape wrap angle 44 measures the angular change between the incoming and outgoing tape directions. As the tape travels over the air bearing element, it drags air along with it, creating an entrained air flow 46 between the tape and the air bearing element. The entrained air supports the tape above the air bearing element, creating an air gap 48 between the tape and the air bearing element. The basic characteristics of this type of hydrodynamic bearing were first described in an article by H. Blok and J. van Rossum, *Lub. Eng.,* 9, 310 (1953).

Figure 4:
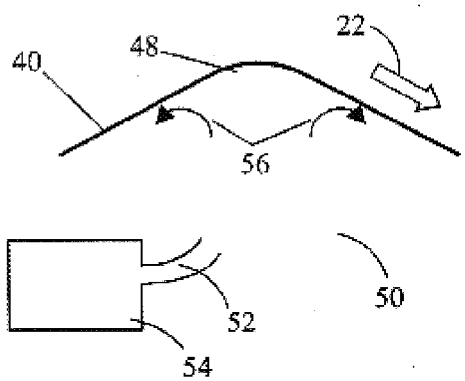
FIG. 4 illustrates principles related to the prior art use of a hydrostatic foil air bearing.

FIG. 4 illustrates principles related to another prior art type of foil air bearing, the hydrostatic or pumped air bearing. A tape 40 is transported in a direction 22 over a porous air bearing element 50. Within the porous air bearing element, positive air pressure is maintained by an air supply line 52 fed by an air pump 54. The pressurized air diffuses through the porous air bearing element causing pumped air flow 56 under the supported section of tape. The pumped air flow supports an air gap 48 between the tape and the air bearing element. Air bars used for tape and web transport are examples of hydrostatic air bearings. Pumped bearings using porous guide materials have been demonstrated to provide full-width support of magnetic tape (U.S. Pat. No. 5,777, 823).

Figure 5:
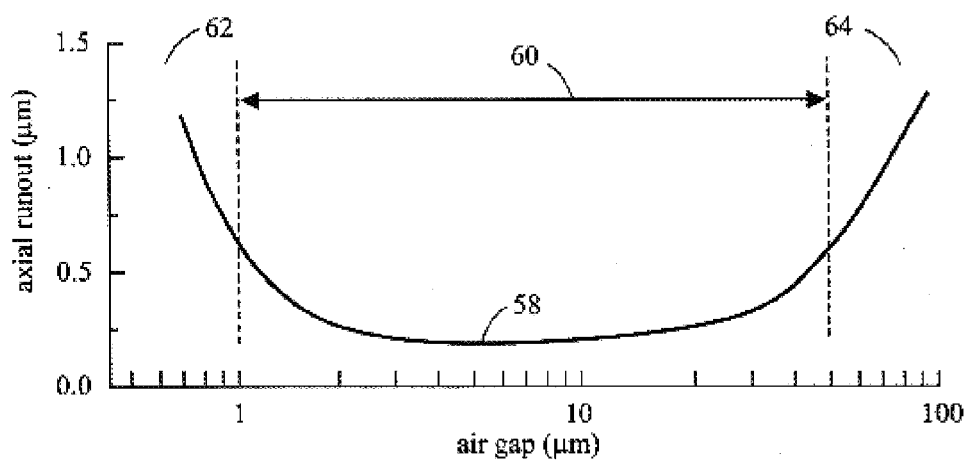
FIG. 5 represents the relationship between dynamic tape runout and air gap thickness in a prior art foil air bearing.

The qualitative relationship between the axial runout of a supported tape and the air gap thickness in a foil air bearing is represented in FIG. 5. Functional curve 58 shows how the axial runout (µm) is dependent on the gap thickness (µm). Over a range of gap thickness 60, the runout is small compared to the typical focus tolerance of an optical head, ±1 µm. If the gap is too small, as in the range of gap thickness 62, asperities on the tape surface can strike the surface of the stabilizer element during transport. Such asperities typically extend 0.1–1 µm beyond the tape surface. Therefore, the air gap must be thicker than about 1 µm to stabilize the tape against this type of disturbance. If the gap is too large, as in gap thickness range 64, the air film under the tape becomes less stiff, allowing the tape to flutter. A large air gap can also lead to substantial nonuniformity in the air gap thickness across the width of the tape and a lack of perpendicularity between the tape and the optical axis. Flutter and nonuniformity can be kept within the focus tolerance of the optical head provided that the air gap is less than about 50 µm.

Figure 6:
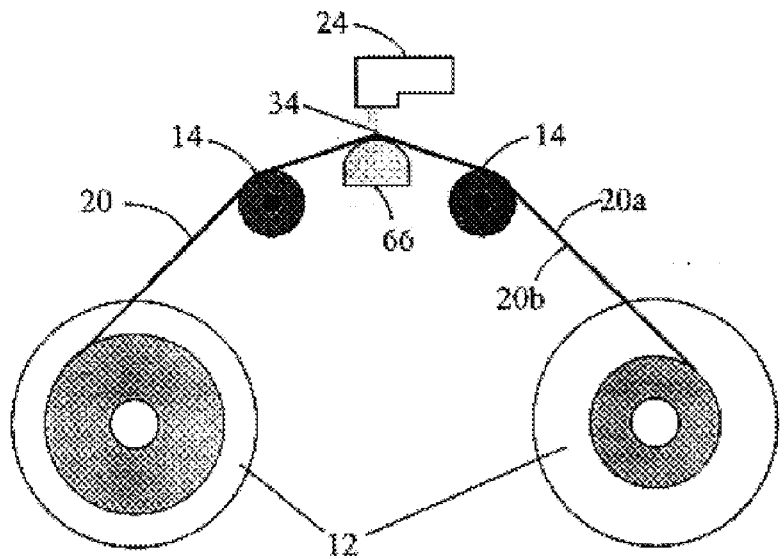
FIG. 6 illustrates an optical tape transport system according to the present invention that provides increased focus stabilization.

According to the present invention, focus stabilization for an optical tape drive is enhanced by incorporating a stabilizer element 66 in the optical tape transport system of FIG. 6 which, in addition to an optical head, also includes conventional tape transport means. Where elements correspond to those in FIG. 1, the same reference numerals will be used. An optical tape 20 is wound on and transported between two reels 12. The tape path is threaded around stabilizer element 66 and other transport elements 14. The back surface of the tape is referenced against the stabilizer element, while an optical head 24 forms one or more focused spot of light 34 on the recording surface of the tape on the section of tape that is supported by the air bearing element. The stabilizer element is disposed on the opposite side to the tape from the optical head.

Figure 7:
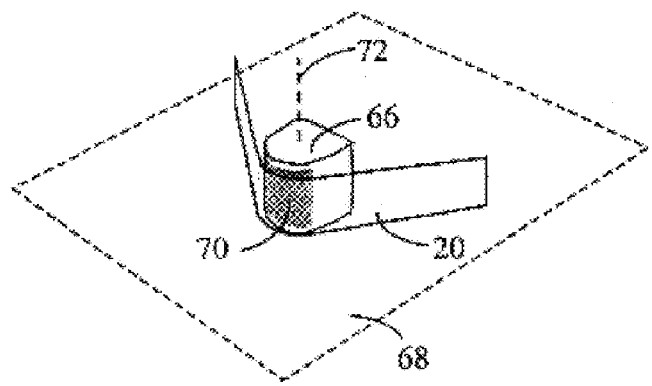
FIG. 7 illustrates the cylindrical character of the optical tape focus stabilizer of FIG. 6.

It has been determined that several conditions must be met by the stabilizer in order for the transport system to reduce tape axial runout sufficiently for effective focus stabilization. Firstly, the stabilizer element must support the full width of the optical tape. The section of the surface of the stabilizer element that supports the tape must have a cylindrical stabilizer surface section 70, meaning that the surface can be traced by a straight line that follows a fixed curve while moving parallel to an axis that is perpendicular to the plane defined by the motion of the tape as it wraps around the stabilizer element. FIG. 7 explains the cylindrical character of the stabilizer. An optical tape 20 transported within a plane 68 is wrapped around a stabilizer element 66. The tape is supported over a section 70 of the stabilizer surface. Every part of surface section 70 is parallel to a stabilizer element axis 72 that is perpendicular to the plane. Substantial deviation from this cylindrical form will cause irregular loading of the tape against the stabilizer or transverse forces destabilizing the tape transport.

Secondly, the stabilizer element must create an air bearing, supporting the optical tape on a cushion of air over the supported section of the stabilizer surface. The air film thickness near the focus of the optical head (at the point of intersection of the optical axis and the stabilizer element surface) must be in the range 1–50 $\mu$m, during reading and writing operations in order to minimize axial runout due to tape asperities and aerodynamic flutter. Maintenance of an air cushion is also important during access operations including high-speed slew and during stop and start operations. In such cases, an air bearing or air cushion prevents tape wear, stiction, and binding. An air cushion should advantageously be maintained when the tape is stopped and therefore air can be pumped through the stabilizer surface section when the tape is stopped.

The thickness of the air gap in a foil air bearing is affected by the curvature of the bearing surface in a plane perpendicular to the stabilizer axis. Under ordinary tape transport conditions, a hydrodynamic air bearing stabilizer with curvature greater than 2.0 cm$^{-1}$ will have an air gap less than about 1 $\mu$m, while a stabilizer with curvature less than 0.07 cm$^{-1}$ will have an air gap larger than 50 $\mu$m. These positive curvature values correspond to a stabilizer surface that is convex in the direction of tape wrap. As discussed previously, the stabilizer surface is flat in the direction parallel to the stabilizer axis.

The thickness of the air film in a hydrodynamic tape bearing is primarily dependent on the bearing curvature at the point where the tape first begins to wrap onto the bearing. It is possible to reduce the tape spacing at the head interface without increasing the curvature under the optical head by selectively increasing the lead-in and lead-out points where the tape path meets the bearing as demonstrated by A. Eshel, *J. Lubr. Tech.*, April 1970, 359.

Thirdly, a foil bearing requires a sufficiently large wrap angle in order to form an air bearing with a region of uniform spacing. If the transport arrangement causes the wrap angle to be too small, the tape spacing at the head interface can be unstable or it can vary with the direction of tape transport or the position of the head across the tape. Within 2.5 degrees of the lead-in and lead-out points where the tape path meets the surface of the stabilizer, the air gap tends to be irregular and nonuniform. Therefore, it is advantageous for the transport arrangement to cause the wrap angle over the stabilizer element to be greater than 5 degrees.

Fourthly, the surface of the stabilizer element should be perpendicular to the optical axis of the optical head or beam emerging from the optical head at the point of intersection between the axis and the stabilizer element, so that writing and reading can be performed with maximum efficiency.

Figure 8:
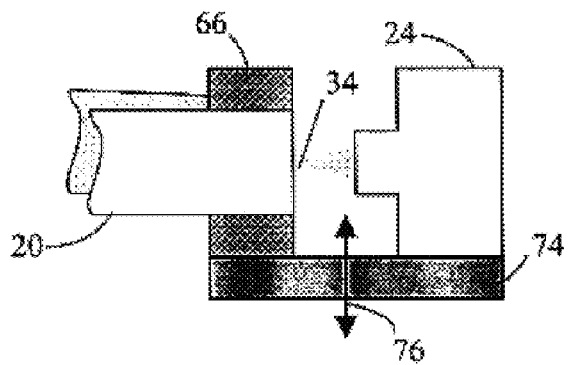
FIG. 8 shows an optical head linked to a stabilizer element according to the present invention for registration across the width of an optical tape.

The alignment of the optical head to the optical tape can be more easily achieved and maintained if the optical head is rigidly linked to the stabilizer as shown in FIG. 8. The optical tape 20 is wrapped around a stabilizer element 66 which is attached to the optical head 24 by a rigid linkage 74. The optical head forms a focused spot 34 on the recording surface of the tape. An actuator 76 moves the head and actuator assembly relative to the tape so that the focused spot accesses positions regions across the width of the tape. During such motion, the stabilizer element maintains the proper axial location of the tape so that the focused spot remains coincident with the tape surface. In this case, the stabilizer surface must be wider than the optical tape, so that the optical head and can be moved in a direction transverse to the tape motion to access different regions of the tape.

Figure 9:
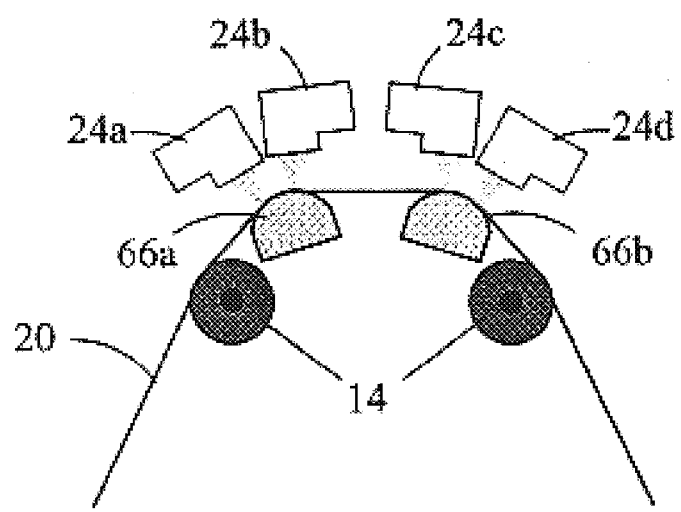
FIG. 9 illustrates an optical tape transport system with a multiplicity of stabilizer elements and optical heads.

It will be understood that the present invention is not limited to an optical tape drive with a single optical head and stabilizer element. FIG. 9 is a view similar to FIG. 6 but illustrates an optical tape system with a multiplicity of stabilizer elements and optical heads. An optical tape transport can include a multiplicity of stabilizer elements 66*a–b* and other transport elements 14. One or more optical heads can be associated with each stabilizer element. For example, heads 24*a* and 24*b* are focused on the tape over stabilizer 66*a* while heads 24*c* and 24*d* are focused on the tape over stabilizer 66*b*. In this way, a single tape transport system can provide focus stabilization for an optical tape medium that is accessed by multiple optical heads.

The invention has been described in detail with particular reference to certain preferred embodiments thereof, but it will be understood that variations and modifications can be effected within the spirit and scope of the invention.

PARTS LIST 10 magnetic tape
10*a* magnetic tape recording surface
10*b* magnetic tape back surface
12 tape reels
14 transport elements
16 magnetic head
18 head/media interface
20 optical tape
20*a* optical tape recording surface
20*b* optical tape back surface
22 tape transport direction
24 optical head
24*a–d* optical heads
26 laser
28 laser beam
30 mirror
32 objective lens
34 focused spot
36 axial runout
38 focus actuator
40 tape
42 hydrodynamic air bearing element
44 wrap angle
46 entrained air flow
48 air gap
50 porous air bearing element
52 air supply line
54 air pump
56 pumped air flow
58 functional curve
60 range of gap thickness
62 range of gap thickness
64 range of gap thickness
66 stabilizer element
66*a–b* stabilizer elements
68 transport plane
70 cylindrical stabilizer surface section
72 stabilizer element axis
74 rigid linkage
76 actuator

What is claimed is:

1. In an optical tape transport system including an optical head, tape transport means, and a focus stabilizer element, the improvement comprising:

a) the stabilizer element including a cylindrical surface section supports the full width of the tape;

b) the stabilizer element being disposed on the opposite side of the tape from the optical head;

c) the optical axis of the optical head being perpendicular to the stabilizer element surface at the point of intersection between the optical axis and the stabilizer surface;
d) the tape being supported at the stabilizer element surface by an air film; and
e) the air film thickness at the point of intersection being in the range 1–50 $\mu$m while the tape is transported for reading or writing;
f) a rigid linkage connecting the stabilizer element and optical head;
g) means for actuating the optical head and stabilizer across the tape width; and
h) the stabilizer element surface being wider than the optical tape.

2. The transport system of claim 1 in which the tape transport means cause the wrap angle of the tape over the stabilizer element to be greater than 5 degrees.

3. The transport system of claim 1 in which the curvature of the stabilizer element surface at the lead-in and lead-out ends of the stabilized interval is less than 2 cm$^{-1}$.

4. The transport system of claim 1 in which the stabilizer element surface section has a curvature in the range 0.07–2 cm$^{-1}$.

5. The transport system of claim 1 including means for generating a hydrodynamic air bearing between the stabilizer element surface and the tape when the tape is transported for recording, readout, or access.

6. The transport system of claim 1 wherein air is pumped through the stabilizer element surface section to form a hydrostatic air bearing between the stabilizer surface section and the tape when the tape is transported for recording, readout, or access.

7. The transport system of claim 1 wherein air through the stabilizer element surface section when the tape is stopped.

8. The transport system of claim 1 including a multiplicity of stabilizer elements and optical heads and wherein one or more optical heads is associated with a particular stabilizer element.

* * * * *